UNITED STATES PATENT OFFICE.

WALTER S. WILKINSON, OF BALTIMORE, MARYLAND.

PAVEMENT MIXTURE.

No. 836,059.

Specification of Letters Patent.

Patented Nov. 13, 1906.

Application filed June 26, 1902. Serial No. 113,288.

*To all whom it may concern:*

Be it known that I, WALTER S. WILKINSON, a citizen of the United States, residing at Baltimore, in the State of Maryland, have invented an Improvement in Paving or Pavement Mixture or Composition, of which the following description is a specification.

My invention aims to improve bituminous paving or pavement mixtures or compositions for use either as a sheet pavement or in the form of blocks or tiles. Bituminous paving or pavement mixtures or compositions ordinarily consist, mainly, of a body material composed of crushed stone or sand, very finely comminuted stony material, dust, or fines, and a cementing or binding agent commonly termed "bituminous cement." If for blocks or tiles, the body material is usually crushed stone with additional dust or fines. If for sheet pavement, the body material is usually sand and dust or fines. The binding agent heretofore usually employed, so far as known to me, has been an asphaltic cement containing, say, from ten per cent. to twenty per cent. of residuum of petroleum or other flux mixed therewith while heated. The asphalts commonly employed for this cement, if used alone, are objectionable because friable at ordinary temperatures, and it is to obviate this, so far as possible, that the flux oil is added. It is customary to add as much flux oil as possible without rendering the pavement unduly soft in warm weather in order to reduce, so far as possible, the friability of the pavement in cold weather.

That pavement or composition is the best and most desirable, other things being equal, wherein the body material alone is relied upon to furnish the principal resistance to the wear of traffic. To accomplish this, all voids, so far as possible, should be filled with stony particles rather than with free cement, the cement serving merely as a surface film or coating to bind or unite every part of the surface of each stony particle to the surfaces of the next adjacent stony particles, however coarse or fine the latter may be; and the presence of voids, however minute, that are filled with free cement constitutes an element of weakness in any bituminous pavement. The fines are reduced as nearly as possible to the form of an impalpable powder or dust the more completely to fill the smallest voids in the mixture or composition, and such fines are usually mainly or wholly of limestone, because limestone appears to possess a pronounced affinity or adhering capacity for bituminous cement. Limestone, furthermore, possesses a detrimental capacity—viz., a capacity for absorbing the residuum or other oil commonly used as a flux. At least its flux-absorbent capacity is greater than that of any other material ordinarily used for fines; and obviously this detrimental absorption of the flux oil by the fines is promoted by the otherwise beneficial proportionate increase of the amount of fines used to that of the cement.

In the preparation of the mixture or composition the prevailing custom formerly was to dry-mix all the body material—viz., the crushed stone or sand and all the fines—and then and while such body material was in a state of agitation, as in a usual pug-mill, to add the asphaltic cement thereto and mix the same therewith to form the complete pavement mixture or composition ready for compression into blocks or tiles or for laying upon the roadway.

In my United States Patent No. 705,728, dated July 29, 1903, I disclosed an improvement upon the former custom in the preparation of paving or pavement mixtures or compositions, said improvement being based upon my discovery that the proportion of fines in the mixture or composition might be largely increased and the proportion of bitumen decreased if a considerable part of the fines be first mixed with the cement before the latter is added to the remaining body material, and this "fines-impregnated" cement, when finally added to such remaining body material, would carry said fines with it into the remotest and most minute voids in the mixture, thereby filling such voids with fines and cement instead of with free cement. The pavement thus made is not only superior in quality and durability, but it is cheaper also, because less bitumen is required, it being restricted to its proper function—viz., cementing one stony particle to another and not used as a filler for voids which properly should be filled with cement-coated stony particles. While these advantages are great and of themselves sufficient to justify the introduction of fines by the use of a "fines-impregnated cement" as described in said patent, it is also true that the fullest possible benefits from the use of a fines-impregnated cement are not realized thereby, because the increased amount of fines used and the more complete and thorough distribution thereof throughout the mass increases the detrimental absorption by such fines of the flux oil in the cement and decreases the possible life of the pavement.

I have also found by careful investigation that residuum of petroleum or other flux oil, such as is usually incorporated in the asphaltic cement, when exposed, as in a pavement, to the air and other elements for a term of years gradually deteriorates. This deterioration occurring during atmospheric exposure I term "oxidation" for want of a better term, although it is probable that more or less action other than strict oxidation takes place. Whatever be the exact nature of this detrimental or deteriorating action, it is a fact that it aids in the disintegration or destruction of the pavement by rendering it more friable, and when the otherwise advantageous fines-impregnated cement is used the resultant more thorough distribution of the cement throughout the pavement and the consequent more complete exposure of the cement to the action of the elements tends to promote disintegration, such as above referred to, and thus further prevents a full realization of the possible benefits obtainable by the use of the fines-impregnated cement.

My present invention aims to produce a paving or pavement mixture or composition made with or by means of a fines-impregnated cement which shall be free or substantially free from the destructive absorbing and oxidizing or deteriorating tendencies or actions above referred to, whereby the full benefits possible from the use of a fines-impregnated cement may be realized, and this aim I accomplish by eliminating from the cement before it is incorporated in the mixture or composition all or substantially all oil that might be absorbed or taken up by the fines or other body material employed, so that such cement may be distributed throughout the mass to the most complete extent and be reduced by impregnation therewith of the fines to the thinnest possible desirable condition of surface coating without danger of destructive action, due to absorption or other elimination of oil therefrom.

To eliminate the destructive oxidizing action above referred to as occurring after the pavement is laid, my present invention comprehends converting the residuum or other flux by artificial oxidation, as by the action of air or otherwise, to a pitchy condition which is substantially permanently elastic and characterized by a relatively high melting-point and non-friability at relatively low temperatures, and this conversion is effected preferably before, but it may be after, the flux so converted is incorporated in the cement. Thus however completely such cement may be restricted by "fines-impregnation" to a surface coating merely distributed throughout the pavement composition no change will occur upon exposure to the air, it having been already changed by air artificially brought in contact with it or by other suitable means before it was introduced into the composition.

I have found, furthermore, that both the elimination of substantially all absorbable flux or oil, as well as the elimination of substantially all oxidizable elements are for convenience obtainable by one and the same treatment—viz., the subjection of the flux to the action of a suitable agent, such as air—prior to or even subsequent to the formation of the cement. Obviously it is preferable to subject the flux to the action of the converting agent prior to the formation of the cement, because at that time there is less volume to be acted upon, and nothing is gained by contact of such agent with the asphalt.

In carrying out my invention I take the asphalt—for instance, Trinidad asphalt—and preferably refine the same, as by the means disclosed in my United States Patent No. 512,348, dated January 9, 1894, to remove the water or moisture therefrom, and I also preferably desalify it, as by the process disclosed in my United States Patent No. 597,892, dated January 25, 1898. I then take any usual flux—such, for instance, as residuum of petroleum—and subject the same to the oxidizing action of a suitable agent in any suitable manner, as by projecting air into or through it while heated, say, to 400° Fahrenheit, the air also being preferably but not necessarily heated. The refined asphalt and the oxidized flux are then mixed in a suitable receptacle in the presence of heat. I have found equal portions, by weight, of Trinidad asphalt and oxidized flux to produce excellent results. If an asphalt be used containing a larger percentage of pure bitumen than Trinidad, a larger percentage of the oxidized flux could and would be employed, for while the flux in the oxidized state at ordinary temperatures possesses a less degree of liquidity than unoxidized flux, yet when incorporated in large quantity with the asphalt the larger proportion of the oxidized flux to the bitumen in the asphalt renders the resultant asphaltic cement sufficiently liquid at proper working temperature to enable it to be conveniently and properly handled. After having been thoroughly mixed in this manner and while still in a heated condition I add a suitable quantity of dust or finely-comminuted limestone or other earthy matter—say, in the proportions of seventy-five pounds thereof to one hundred pounds of the bituminous cement—to form a fines-impregnated cement. I do not herein claim this method of introducing the fines nor, broadly, the formation of a fines-impregnated cement, as the same in the sense here used are covered in my said Letters Patent of the United States already referred to. Having by this impregnation of the cement with fines obtained the most thorough and complete incorporation or mixture of such fines and the cement, I bring such fines-impregnated cement into contact with the remaining body material in suitable manner, as by adding the cement, preferably gradually, to such remaining body material while the latter is in a state of agitation, as in a usual pug-mill. When the said remaining body material consists of crushed stone, I have obtained excellent results by using the same in the proportions, say, of eight hundred and fifty pounds to nine hundred and fifty pounds thereof to about one hundred and fifty pounds to one hundred and forty pounds of the fines-impregnated cement. For the best results the said remaining body material should first be heated and dry-mixed in the pug-mill and then the heated fines-impregnated cement added thereto and mixed therewith. The resultant mixture or composition is then ready for compression for use. If for blocks, it is compressed under heavy pressure in a mold and the resultant compressed body quickly cooled in flowing water or otherwise to set it exteriorly to preserve its shape. If for sheet-pavements, the said mixture is laid while heated and is tamped or rolled upon the roadway.

When the amount of fines that may be found with the body material, together with the fines, it is possible to add to the cement and still preserve its necessary liquidity, does not equal the whole amount of fines desired in the mixture or composition, any additional fines may be added to and dry-mixed with the body material in usual manner.

It must be understood, of course, that the proportions, &c., herein given are merely by way of example, and that the same will in all respects be modified, as required, by varying conditions and materials in connection with which the work is to be performed.

An asphaltic or bituminous cement wherein oxidized flux is used contains practically no oil, at least so little that it may be regarded as negligible. Consequently there is no opportunity for destruction of the pavement from any cause due to the presence of such oil, as by the process of absorption or oxidation of oil, as heretofore. This is especially advantageous when fines-impregnated cement, as described in my said application is used, for it enables for the first time the full benefit and advantage of such cement to be realized.

The use herein for the first time, as I believe, of a fines-impregnated cement in which the asphalt has been previously desalified is also important, for this same capacity of such cement to increase the extent to which the voids are filled with cement-coated "fines" and to restrict the cement to its proper function of a surface coating or film only, gives opportunity for the soluble salts and non-bituminous organic substances ordinarily found in Trinidad asphalt (which is most largely used for pavement purposes) to work to the detriment of the pavement. One reason for this is that the non-desalified asphalt if used in fines-impregnated cement is spread out in thinner surfaces than if used in the ordinary asphaltic cement, and obviously the thinner the surface containing a soluble element the more readily it is destroyed when opportunity for the solution of such element occurs. Hence the desalified asphalt is of peculiar advantage when used by way of the fines-impregnated cement, because it eliminates this destructive tendency, and thereby correspondingly benefits the pavement. While, therefore, the benefits due to the introduction of the fines by way of the fines-impregnated cement are sufficient to justify and warrant its use in the presence of the conceded destructiveness of flux oils or of unoxidized flux or of non-desalified asphalt, any or all of them, yet when used with the cement, wherein the amount of oils is negligible or with converted flux or with desalified asphalt, any or all of them, the benefits are largely increased. In the same manner also the use for the first time in a paving or pavement mixture or composition of desalified asphalt and converted flux, whether or not introduced by way of fines-impregnated cement, makes it possible, as I believe, for the first time in the art for both the asphalt and the flux to exert in the pavement composition the maximum possible beneficial effects.

While the conversion of a flux oil to a permanently elastic substance renders the paving composition when properly constituted far more durable, a much larger proportion of the converted than of the unoxidized flux is required to give the pavement the necessary plasticity. Converted flux, however, is much less affected by changes in temperature than unoxidized flux. Hence a much larger proportion of the converted flux may be incorporated in the cement to render the pavement more rubbery and elastic at low temperature without danger of undue softening at high temperature. In other words, oxidized or converted flux renders the pavement much less friable at low temperatures, while no softer at high temperatures. While the flux after having been subjected to the action of a converting or oxidizing agent is herein referred to for convenience as "oxidized flux" or "converted flux," it would perhaps also and properly be designated as "pitch."

I claim—

1. The improvement in the manufacture of bituminous pavement mixture which consists in rendering a flux oil non-absorbable through the action of a converting agent preparing a bituminous cement by mixing asphalt therewith, adding fines thereto and thoroughly surface-coating the said fines with the non-absorbable flux-oil cement and then adding the resultant mixture to a quantity of dry-mixed remaining body material.

2. That improvement in the manufacture of bituminous paving or pavement mixture or composition which consists in producing a "fines-impregnated" bituminous cement by subjecting flux oil to the action of a converting agent and thereby forming an elastic substance, mixing the resultant product with asphalt to form an asphaltic cement, and impregnating the same with fines, dry-mixing the remaining body material, and then, while the latter is in agitation, mixing therewith said "fines-impregnated" cement.

3. The improvement in the manufacture of bituminous paving or pavement mixture or composition which consists in forming a "fines-impregnated" bituminous cement containing a negligible quantity, if any, of oil, impregnating said cement with such of the fines as may be added thereto while still preserving the necessary liquidity of the cement, agitating the remaining body material and while the latter is in agitation mixing therewith said "fines-impregnated" cement.

4. That improvement in the manufacture of bituminous paving or pavement mixture or composition which consists in producing a "fines-impregnated" cement by converting the flux oil to an elastic substance, mixing the resultant product with asphalt, to form an asphaltic cement, and impregnating the same with fines, agitating the remaining body material, and, while in agitation, mixing therewith the "fines-impregnated" cement, subjecting the resultant mixture to heavy compression in a mold, and subjecting the compressed body to the action of a cooling agent to set it to preserve its shape.

In testimony whereof I have signed my name to this specification in the presence of two subscribing witnesses.

WALTER S. WILKINSON.

Witnesses:
L. RABILLON,
C. C. POULTNEY.